T. H. & G. L. SCHROR.
AUTOMOBILE HEADLIGHT.
APPLICATION FILED DEC. 2, 1916.
1,237,830.
Patented Aug. 21, 1917.
2 SHEETS—SHEET 1.
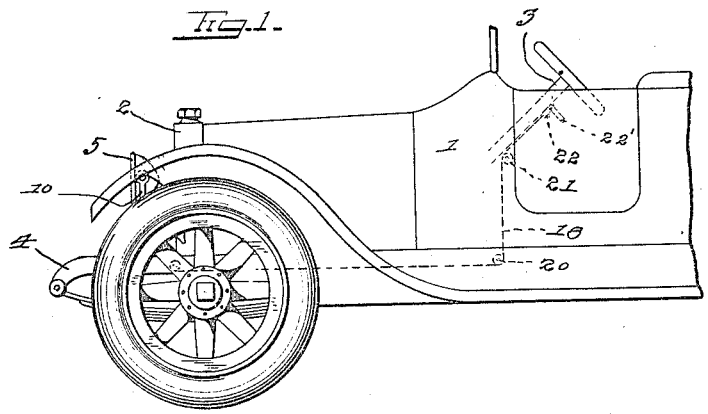
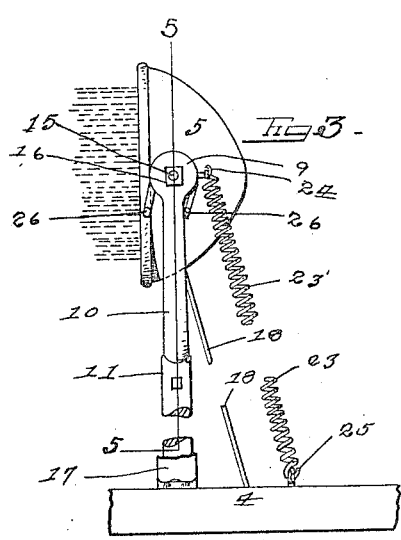 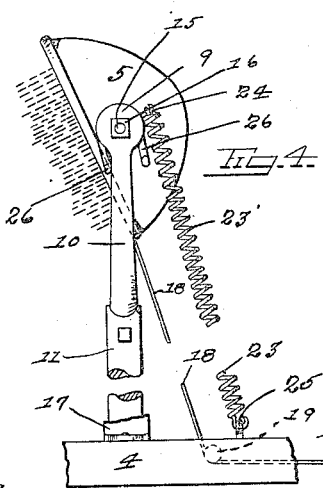 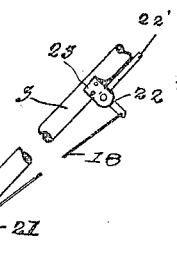

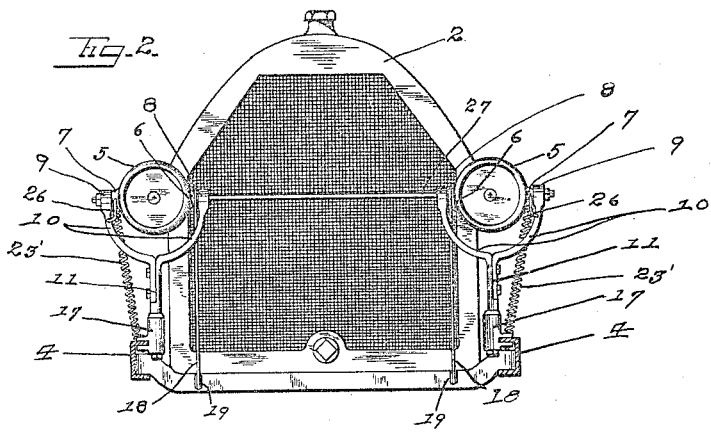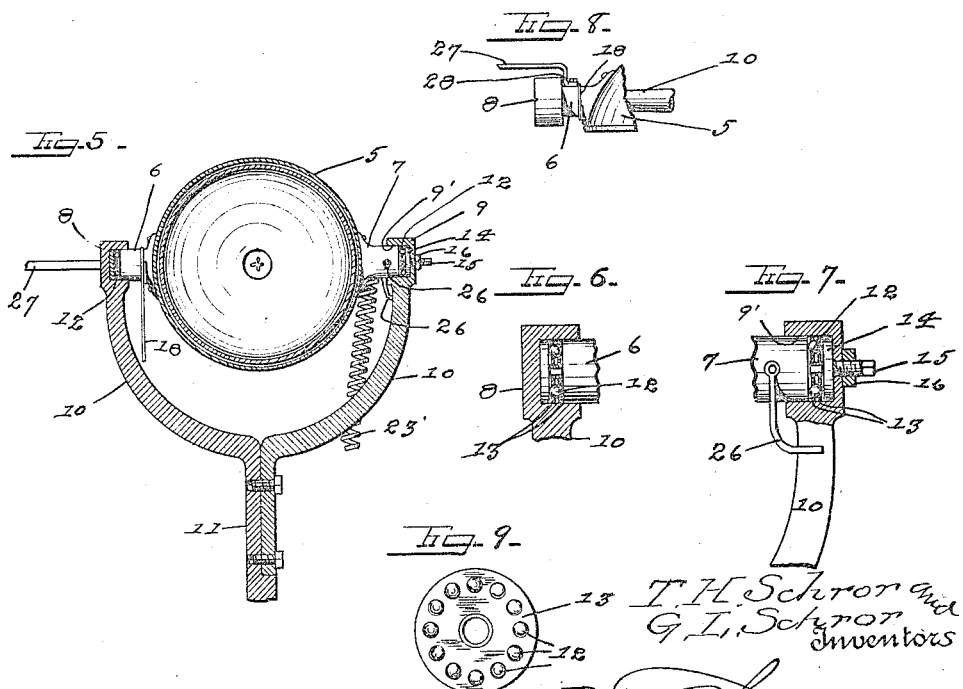

UNITED STATES PATENT OFFICE.

THEODORE H. SCHROR AND GEORGE L. SCHROR, OF CALEDONIA, NEW YORK.

AUTOMOBILE-HEADLIGHT.

1,237,830.      Specification of Letters Patent.     Patented Aug. 21, 1917.

Application filed December 2, 1916. Serial No. 134,614.

*To all whom it may concern:*

Be it known that we, THEODORE H. SCHROR and GEORGE L. SCHROR, citizens of the United States, residing at Caledonia, in the county of Livingston and State of New York, have invented certain new and useful Improvements in Automobile-Headlights, of which the following is a specification.

Our invention relates to improvements in automobile headlights, its primary object being the provision of a headlight having means whereby the same may be operated to project the rays of light in a downward direction to prevent the blinding of an oncoming machine.

A further object of our invention is the provision of an automobile headlight for the purpose stated which will have its operating or controlling means within easy reach of the driver of the machine and which will be capable of instant operation.

Another object of the invention is the production of a headlight of the character and for the purpose stated which will be of very simple construction and inexpensive to manufacture, and one which may be attached to machines at the time of their manufacture or to the machines now in use.

With the above and other objects in view which will appear as the description proceeds the invention consists in the novel construction, combination and arrangement of parts hereinafter described and claimed, it being understood that changes in the precise embodiment of the invention herein disclosed can be made without departing from the spirit of the invention.

In the accompanying drawings we have illustrated one complete example of the physical embodiment of our invention constructed according to the best mode we have so far devised for the practical application of the principles of our invention.

Figure 1 represents a side elevation of a portion of an automobile with our headlights attached thereto, the controlling means being shown in dotted lines.

Fig. 2 represents a front elevation of the radiator of an automobile and our headlights secured in brackets or holders riveted to the chassis frame, the chassis frame being shown in cross section.

Fig. 3 represents a side elevation of one of our headlights in normal position.

Fig. 4 represents a side view in elevation of one of our headlights, the standard therefor, a portion of the chassis frame to which the bracket or holder carrying the standard is secured, and a portion of the steering post with the controlling or operating lever secured thereto, the headlight being in the position it assumes when projecting the rays of light in a downward direction.

Fig. 5 represents a view taken on line 5—5 of Fig. 3.

Fig. 6 represents a view partly in section and partly in elevation of the upper end of the inner arm of the standard.

Fig. 7 represents a view similar to Fig. 6 of the outer arm of the standard.

Fig. 8 represents a top plan view of the inner standard arm and the corresponding portion of the headlight, and Fig. 9 represents a top plan view of the ball bearing used in supporting the lights in the standards.

In the drawings, in which similar numerals designate like parts throughout the several views:—

The numeral 1, designates the automobile which may be of any desired make and design, and having the usual radiator 2, steering post 3, and chassis frame 4.

Our headlights 5, have secured to their opposite sides the similar shanks or studs 6 and 7 which are rotatably mounted in the ends 8 and 9 of the arms 10 of the two part standards 11, the ball bearings 12 carried by the ball retainer 13, being provided for each of the shanks 6 and 7 to permit the easy turning thereof, said ends 9 having in the openings 9' and bearing against the bearings therein, the plates or washers 14 having the threaded studs 15 and nuts 16 for adjusting the side thrust of the lugs or shanks 6 and 7 in the arms 10.

Thus it will be seen that the standards 11 are secured in the pair of holders or brackets 17 secured to the chassis frame 4, and that the headlights 5 are pivotally mounted in the standards. In order that the headlights may be turned down to throw the rays of light in a downward direction or be turned to throw the rays of light forward, the shanks 6, have secured thereto and winding one or more times therearound, the cords or ligaments 18, which pass down therefrom over the pulleys 19, and over pulleys 20 and 21 to the controlling lever 22 of right angled shape and pivoted in the bracket 23 secured to the steering post 3.

From this description it will be seen that when the lever 22 is in the position shown in Fig. 1 the headlights are in normal position for throwing the rays of light in a forward direction, and when the arm 22' of the lever 22 is brought parallel with the steering post 3, see Fig. 4, the light is projected downward, as also illustrated by Fig. 4. To bring the headlights to normal position when the lever 22 is returned to the position it occupies in Fig. 1, the springs 23' are employed which have their upper ends secured to the lugs or hooks 24 carried by the shanks 7 and their lower ends secured in the eye bolts 25 carried by the chassis frame 4, the shanks 7 also carrying the stops 26 which prevent the headlights turning completely around should the cords 18 break and which also limit the downward movement of the headlights.

To insure the concerted movement of the headlights we provide the transverse bar 27 extending across the machine and having its ends 28 secured to the lugs 6 of the headlights.

Most of the headlights now in general use are fixed in one position and when approaching another machine it is necessary to dim the light or put the light out altogether, which is dangerous to do when driving on a dark road. Our headlight is designed to overcome this inherent objection and as is obvious when the controlling lever is brought to the position shown in Fig. 4, the headlights are tilted and the rays of light are projected downward, still illuminating the road, but not blinding the driver of the oncoming machine, as shaft of light is not projecting forward.

We claim:—

1. The combination with an automobile frame, its steering device, and a holder fixed on the frame, of a standard carried by said holder and formed with a pair of arms, stub shafts mounted in said arms, a headlight mounted between said stub shafts, means for tilting the headlight to project the rays of light downwardly, and means for returning the headlight to normal position, said means consisting of a spring having its upper end secured to a lug carried by one of said stub shafts and its lower end secured to the automobile frame, substantially as described.

2. The combination with an automobile frame, its steering device and a holder fixed on the frame, of a standard carried by said holder and formed with a pair of arms, stub shafts mounted in said arms, a headlight mounted between said stub shafts, means for tilting the headlight to project the rays of light downwardly, means for returning the headlight to normal position, and a pair of depending rods secured to one of said stub shafts, said rods forming stops for limiting the downward movement of the headlight and for retaining said headlight in normal position, substantially as described.

In testimony whereof we affix our signatures in the presence of two witnesses.

THEODORE H. SCHROR.
GEORGE L. SCHROR.

Witnesses:
HOWARD M. SIMPSON,
JOHN CAMPBELL.